United States Patent [19]
Ott

[11] Patent Number: 5,009,400
[45] Date of Patent: Apr. 23, 1991

[54] ACTIVE SPRING-AND-DAMPER SYSTEM

[75] Inventor: Gerhard Ott, Herrenberg, Fed. Rep. of Germany

[73] Assignee: Dr. Ing. h.c.F. Porsche AG, Fed. Rep. of Germany

[21] Appl. No.: 443,316

[22] Filed: Nov. 30, 1989

[30] Foreign Application Priority Data

Dec. 16, 1988 [DE] Fed. Rep. of Germany ....... 3842338

[51] Int. Cl.$^5$ .............................................. B60G 17/00
[52] U.S. Cl. ............................ 267/64.11; 267/64.16; 267/64.25; 267/64.26
[58] Field of Search ...................... 188/299; 267/64.11, 267/64.13, 64.16, 64.25, 64.26, 121, 218; 280/707, 709

[56] References Cited

U.S. PATENT DOCUMENTS 3,567,244 3/1971 Hoffmann et al. ................ 267/64.26
4,887,515 12/1989 Tabata .............................. 267/64.16

FOREIGN PATENT DOCUMENTS 2738455 3/1979 Fed. Rep. of Germany .
2386427 11/1978 France ............................... 267/64.25
906848 9/1962 United Kingdom ............. 267/64.26

*Primary Examiner*—Matthew C. Graham
*Attorney, Agent, or Firm*—Evenson, Wands, Edwards, Lenahan & McKeown

[57] ABSTRACT

An active spring-and-damper system for placement between a vehicle body and a wheel guiding member comprises a piston/cylinder unit having a pressure chamber for static load support and two additional pressure chambers for dynamic load control. The pressure chambers are arranged in a cylindrical housing and are equipped with connections for hydraulic lines. A first and second of the pressure chambers are separated by a piston. The piston is connected with a hollow piston rod forming the third pressure chamber. All pressure chambers are closed off with respect to one another by way of at least three sealing devices.

9 Claims, 1 Drawing Sheet

ACTIVE SPRING-AND-DAMPER SYSTEM

BACKGROUND AND SUMMARY OF THE INVENTION

The invention relates to an active spring-and-damper system for inserting between a vehicle body and a wheel suspension member comprising a piston/cylinder unit having a pressure chamber for static load support and two additional pressure chambers for dynamic load control. The pressure chambers are arranged in a cylindrical housing and are equipped with connections for hydraulic lines.

The coordination of spring-and-damper systems at the chassis of motor vehicles consists of a compromise between driving safety and driving comfort. In the case of known "passive" spring-and-damper systems, the force between the vehicle body and the wheel is only a function of the spring travel and the damper speed. Energy can only be stored by means of a spring or absorbed by way of a damper. These limitations necessarily result in a considerably restricted range in which driving safety and driving comfort can be coordinated.

Through active interventions into a spring-and-damper system according to DE-OS 27 38 455, a mechanism is provided to shift these range restrictions toward more driving safety and more comfort. By means of this known active spring-and-damper system, an arbitrary force may be applied as a function of various influencing variables. Hydraulic control elements are preferably used for generating the force. A basic static wheel load is supported by means of an integrated conventional hydropneumatic spring element and only the dynamic forces are applied by way of an active control element. According to DE-OS 27 38 455, a known control element of the active spring-and-damper system has effective areas of a different size which therefore generate unequal volume flows in the direction of pull and in the direction of pressure. In addition, a spring strut is equipped with a plurality of dynamic sealing devices for the mutual sealing of the pressure chambers.

It is an object of the invention to provide an improved control element having a shorter overall length and a simplified construction by which approximately equal volume flows are generated between the pressure chambers. Also these pressure chambers are closed off with respect to one another with the smallest possible number of dynamic sealing devices.

According to the invention, this object is achieved by having the first and second pressure chambers in a cylindrical housing and separated by a piston. The piston is connected with a hollow piston rod forming the third pressure chamber, and all pressure chambers are sealed off with respect to one another by means of at least three sealing devices. A coaxially arranged guide rod is connected with the cylindrical housing and extends into the third pressure chamber inside the hollow piston rod and to the housing floor. The piston rod is connected through the housing floor through a sealing device.

Alternatively the first pressure chamber can be provided in the cylindrical housing, a second pressure chamber provided inside a hollow piston rod, and third pressure chamber is arranged in the cylindrical housing, partially surrounded by the first pressure chamber and closed off by means of a guide rod connected with the piston rod. The guide rod projects into the pressure chamber and is guided through the housing floor of the cylindrical housing by a sealing device. Here the first and third pressure chambers are coaxially disposed inside one another and the first pressure chamber has a circular-ring-shaped cross-section and the third pressure chamber has a circular cross-section. The first pressure chamber is formed between a wall of the hollow piston rod and a wall of he cylindrical housing and comprises a first effective surface. The second pressure chamber is arranged inside the shaft of the piston rod and has another effective surface. Here the first pressure chamber is closed off by two circumferential sealing devices and the second and the third Pressure chambers are sealed off by means of additional sealing devices provided in the housing floor.

The principal advantages achieved by the invention are that a cylindrically designed housing in connection with a hollow piston rod, forms three pressure chambers with two cooperating pressure chambers being controllable for the dynamic wheel load and another pressure chamber being used for the support of the static wheel load. The pressure chambers are arranged such that the shortest possible overall length is obtained and are connected to at least three pressure inlets.

The control element consists essentially of two components which are guided in one another to form the pressure chambers between them and are sealed off with respect to one another by means of at least three dynamic sealing devices.

For generating equal volume flows from and into the cooperating pressure chambers during the compression and rebound of the control element, the effective surfaces in these pressure chambers are of approximately the same size.

Other objects, advantages and novel features of the present invention will become apparent from the following detailed description of the invention when considered in conjunction with the accompanying drawings.

DETAILED DESCRIPTION OF THE DRAWINGS

Figure 1:
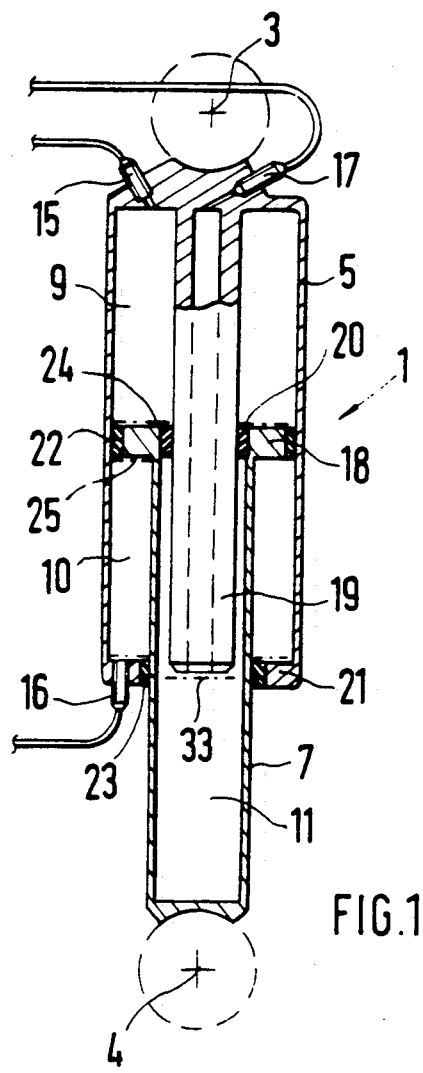
FIG. 1 is a sectional view of a control element with corresponding pressure chambers in the cylindrical housing and a third pressure chamber in a hollow piston rod.

A control element 1, 2 (FIG. 1 and 2, respectively) for an active spring-and-damper system is arranged between a vehicle body and a wheel suspension member 4. It comprises a cylindrical housing 5, 6 in which a hollow piston rod 7, 8 is guided and which, together with the housing 5, 6, forms pressure chambers 9, 10 and 11 according to the construction of FIG. 1 and pressure chambers 12, 13, and 14 according to the construction of FIG. 2. Connections 15, 16 and 17 for hydraulic lines are connected with these pressure chambers.

Figure 2:
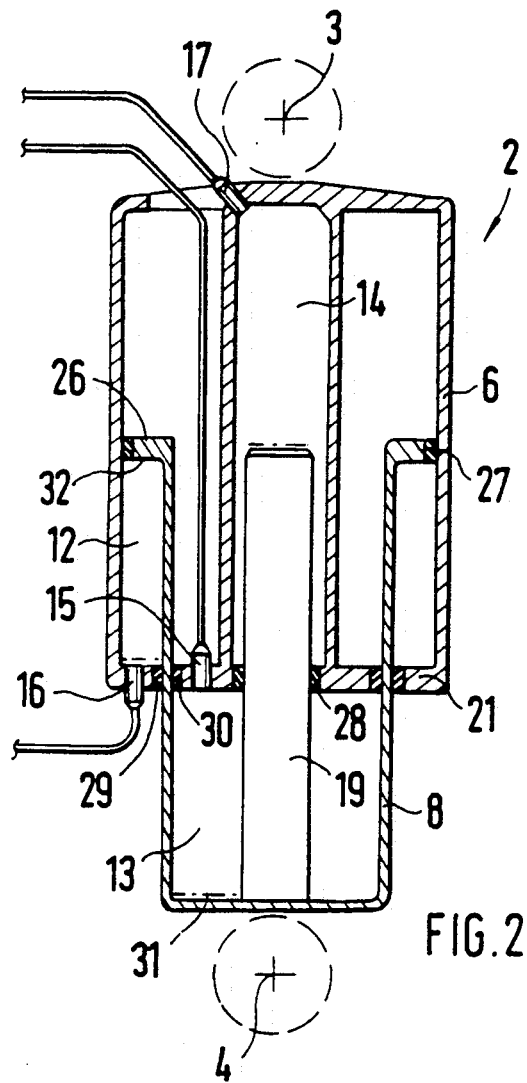
FIG. 2 is another embodiment of a control element with pressure chambers in a housing inside the hollow piston rod, as well as with a third chamber in the cylindrical housing.

According to the construction of FIG. 1, dynamic wheel loads can be controlled by way of the first and second pressure chamber 9 and 10 and by way of the second and third pressure chamber 10 and 11. The third pressure chamber 11 and the first pressure chamber 9 are provided for the static load suspension. Pressure chambers 9 and 10 are separated with respect to one another by means of a piston 18 which is connected with the hollow piston rod 7, which supports itself at a wheel suspension member 4. The third pressure chamber 11 is sealed off with respect to the first pressure chamber 9 and with respect to a guide rod 19 projecting into the pressure chamber 11 by means of a dynamic sealing device 20. The guide rod 19 extends to the floor 21 of the housing 5 and thus, the sealing device 20 permits a sealing contact of the piston 18 throughout the whole amplitude of the control element 1. On the outer side of the circumference of the piston 18 there is sealing device 22 for sealing the piston with respect to the housing wall and another dynamic sealing device 23 closes off the piston rod 7 with respect to the housing floor 21. When chamber 9 or 11 of the control element 1 is acted upon by pressure through connection 15 or 17, an effective surface 24 or 33 is acted upon and the control element 1 is lengthened, whereas, when chamber 10 is acted upon by pressure, the effective surface 25 of the piston 18 causes a shortening of the control element 1. The feeding of pressure to the pressure chamber 11 advantageously takes place through a hollow guide rod 19 so that the connection 17 carries out only small movements relative to the body.

According to the other embodiment, the control element 2 (FIG. 2), has a hollow piston rod 8 which is guided in the cylindrical housing 6. This hollow piston rod 8, together with the piston end part 26 are guided in the housing 6 and define a piston with a first pressure chamber 12 for the dynamic load support, a second pressure chamber 13 (formed outside the housing 6 in the hollow piston rod 8) for the dynamic load support.

The third pressure chamber 14 is arranged inside the housing 6 and coaxial with respect to the first pressure chamber 12 and is used for the static load support. This third pressure chamber 14 is partly surrounded by the first pressure chamber 12. The guide rod 19 has a length which corresponds to the piston rod 8 and is connected with the floor 27 of the piston rod. The guide rod 19 projects into the third pressure chamber 14.

At the end piece 26, the first pressure chamber 12 is sealed off with respect to a wall of the cylindrical housing 6 by means of a dynamic sealing device 27. In the area in which the hollow piston rod 8 passes through the housing floor 21, two additional sealing devices 29 and 30 are provided. In addition, a sealing device 28 is arranged between the guide rod 19 and the housing floor 21.

When chamber 13 is acted upon by pressure by way of the connection 15, the effective surface 31 is acted upon and the control element 2 is extended. Pressure from connection 17 acting on the end of guide rod 19 will also extend control element 2. When chamber 12 is acted upon by the effective surface 32 by way of connection 16, the control element is shortened.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An active spring-and-damper system for placement between a vehicle body and a wheel suspension member, the system comprising:
    a piston cylinder unit which has a pressure chamber for static load support and two additional pressure chambers for dynamic load control;
    all the three pressure chambers are arranged in a cylindrical housing and are equipped with connections for hydraulic lines;
    a first and a second pressure chamber of the three pressure chambers are located in a cylindrical housing on opposite sides of a piston;
    the piston is connected with a hollow piston rod defining the third pressure chamber of the three pressure chambers;
    all the pressure chambers are sealed off with respect to one another by means of at least three sealing devices;
    a guide rod is coaxially arranged within and connected with the cylindrical housing;
    the guide rod extends into the third pressure chamber which is located inside the hollow piston rod; and
    the hollow piston rod is sealed by one of the three sealing devices to a housing floor of the cylindrical housing.

2. An active spring-and-damper system for positioning between a vehicle body and a wheel suspension member comprising:
    a piston cylinder unit which has a pressure chamber for static load support and two additional pressure chambers for dynamic load control;
    wherein all the three pressure chambers are arranged in a cylindrical housing and are equipped with connections for hydraulic lines;
    wherein a first pressure chamber of the three pressure chambers is provided in a control element cylindrical housing;
    wherein a second pressure chamber of the three pressure chambers is provided inside a hollow piston rod;
    wherein a third pressure chamber of the three pressure chambers is arranged in the cylindrical housing, partially surrounded by the first pressure chamber and is closed off by a guide rod connected with the piston rod;
    and wherein the guide rod projects into the third pressure chamber and is guided through housing floor by a sealing device.

3. A damper system according to claim 2, wherein the first and third pressure chambers are coaxially disposed inside one another in the cylindrical housing;
    wherein the first pressure chamber has a circular-ring-shaped cross-section; and
    wherein the third pressure chamber has a circular cross-section.

4. A control element according to claim 3 wherein the first pressure chamber is sealed off by means of two circumferential sealing devices and wherein the second and the third pressure chamber are sealed off by means of additional sealing devices provided in the housing floor.

5. A damper system according to claim 3, wherein the first pressure chamber is formed between a wall of the hollow piston rod and a wall of the cylindrical housing and has a first effective surface; and
    wherein the second pressure chamber is arranged inside a shaft of the piston rod and has another effective surface.

6. A control element according to claim 5 wherein the first pressure chamber is sealed off by means of two circumferential sealing devices and wherein the second and the third pressure chamber are sealed off by means of additional sealing devices provided in the housing floor.

7. A control element according to claim 2 wherein the first pressure chamber is sealed off by means of two circumferential sealing devices and wherein the second and the third pressure chamber are sealed off by means of additional sealing devices provided in a housing floor.

8. A damper system according to claim 2 wherein the first pressure chamber is formed between a wall of the hollow piston rod and a wall of the cylindrical housing and has a first effective surface; and wherein the second pressure chamber is arranged inside a shaft of the piston rod and has another effective surface.

9. A control element according to claim 8 wherein the first pressure chamber is sealed off by means of two circumferential sealing devices and wherein the second and the third pressure chamber are sealed off by means of additional sealing devices provided in a housing floor.

* * * * *